United States Patent [19]

Finley

[11] 3,724,441

[45] Apr. 3, 1973

[54] CAMP STOVE TRAY TO CASE MOUNT
[75] Inventor: Carl E. Finley, Sycamore, Ill.
[73] Assignee: Olin Corporation, New Haven, Conn.
[22] Filed: Aug. 25, 1971
[21] Appl. No.: 174,728

[52] U.S. Cl. .............................. 126/38, 126/214 R
[51] Int. Cl. .............................................. F24c 5/20
[58] Field of Search ................... 126/38, 214 R, 39 H

[56] References Cited

UNITED STATES PATENTS 2,107,972   2/1938   Antrim et al. ................. 126/214 R X

FOREIGN PATENTS OR APPLICATIONS 179,011   4/1962   Sweden ................................ 126/38
807,970   1/1959   Great Britain ....................... 126/38

Primary Examiner—William F. O'Dea
Assistant Examiner—Harold Joyce
Attorney—Donald R. Motsko et al.

[57] ABSTRACT

A camp stove of the portable variety which includes a casing basal portion on which are mounted burners and an igniter. A tray is releasably mounted on the casing to protect the casing against spattering and dirt and may be easily removed for cleaning. A grill is seated on the tray for supporting cooking utensils over the burners, the grill being easily removed for cleaning.

3 Claims, 5 Drawing Figures

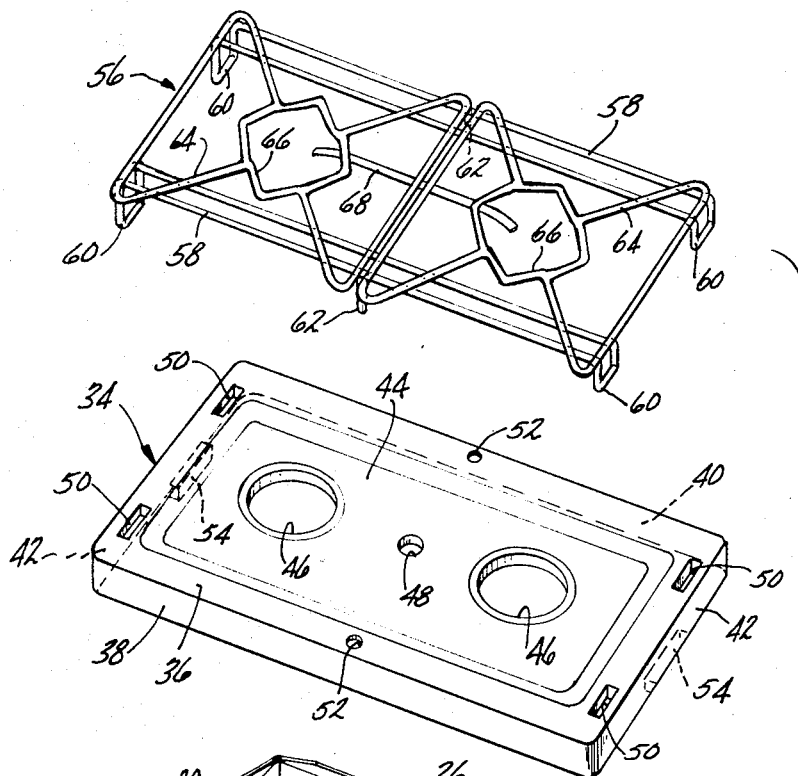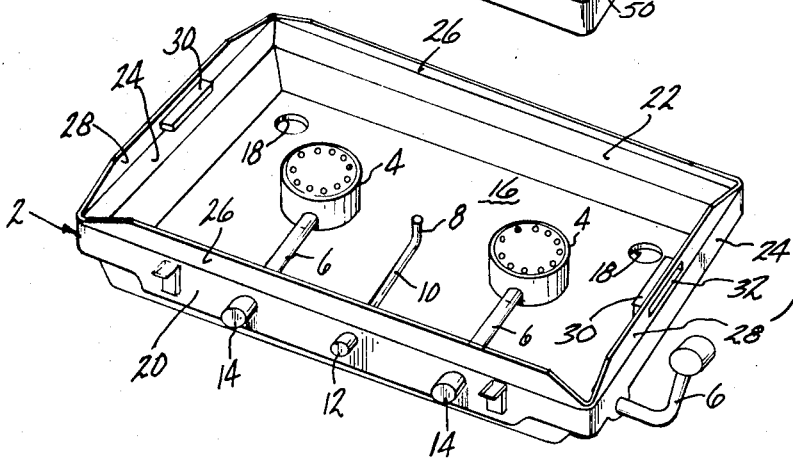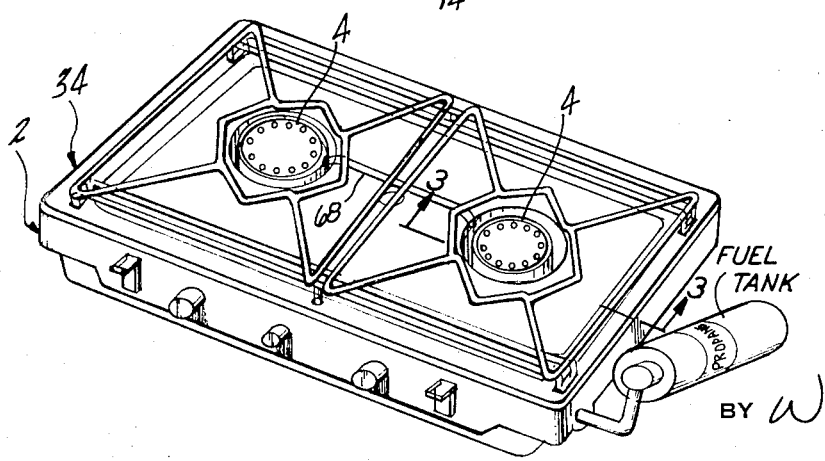

CARL E. FINLEY
INVENTOR

BY *William W. Jones*

ATTORNEY

CAMP STOVE TRAY TO CASE MOUNT

This invention concerns a portable camp stove assembly which is readily disassembled for cleaning and yet which presents a stable assembly for use in the field.

Portable camping stoves which include a casing for mounting of the component parts of the stove are known generally in the prior art. The casing may serve as an attractive housing and base for the stove, and also as a support for the burners, fuel source, grease tray, grill, and other stove components. The various stove components are conventionally secured to the casing so as to, at best, require tools for disassembly for cleaning, or at worst to render thorough cleaning of the grill and grease tray difficult, if not impossible.

With camp stoves of the character described, the grease tray and grill are the two stove components which receive the vast majority of dirt, grease, and grime when the stove is used, and indeed the object of providing a grease tray is to protect the stove casing from being soiled and spattered by grease. Protection of the casing with such a tray is desirable because the burners, fuel conduits, control valves, and the like are secured to the casing and are not amenable to being immersed in cleaning solutions. Thus thorough cleaning of the camping stoves of the prior art is difficult.

The camp stove of this invention includes a casing which serves as a base for the stove and on which are securely mounted the burners, fuel conduits, fuel flow control valves and knobs, and an igniter. The side walls of the casing include upwardly and inwardly extending resilient tabs which serve to locate and position the tray. Opposed ones of the tabs are provided with means forming slots. A tray is provided of sheet metal and including burner openings, an igniter opening, and a downwardly depending side wall which engages the casing tabs. The tray side wall and casing tabs serve to hold the tray against lateral movement with respect to the casing. The portions of the tray side wall corresponding to the slotted tabs on the casing are provided with inwardly extending flanges which are received by the tab slots to hold the tray against vertical movement with respect to the casing. The tray can be intentionally removed from the casing by forcing the slotted tabs inwardly and concurrently lifting the tray upwardly to disengage the tray flanges from the tab slots. The tray is also provided with a number of slots and apertures which receive depending legs formed on the grill to hold the grill against lateral movement with respect to the tray. The grill is removed from the tray by lifting the grill away from the tray. In this manner the grill and tray can be easily removed from the casing for cleaning separate from the casing.

It is, therefore, an object of this invention to provide a camping stove of the portable variety which is easily disassembled for cleaning.

It is a further object of this invention to provide a camping stove of the character desired which includes a tray to protect the stove case from spattering grease and the like, and which tray is easily detached from the case for cleaning.

It is yet another object of this invention to provide a camping stove of the character described which includes a casing, tray, and grill which is easily disassembled, of simple construction, and relatively inexpensive to manufacture.

These and other objects and advantages of the invention will become more readily apparent from the following detailed description of a preferred embodiment taken with the accompanying drawings, in which:

FIG. 1 is a perspective view of a preferred embodiment of the camp stove of this invention in the form of a propane-fueled two burner stove;

FIG. 2 is an exploded perspective view of the stove of FIG. 1 showing the case tabs, the tray configuration and the grill configuration;

Figure 3:
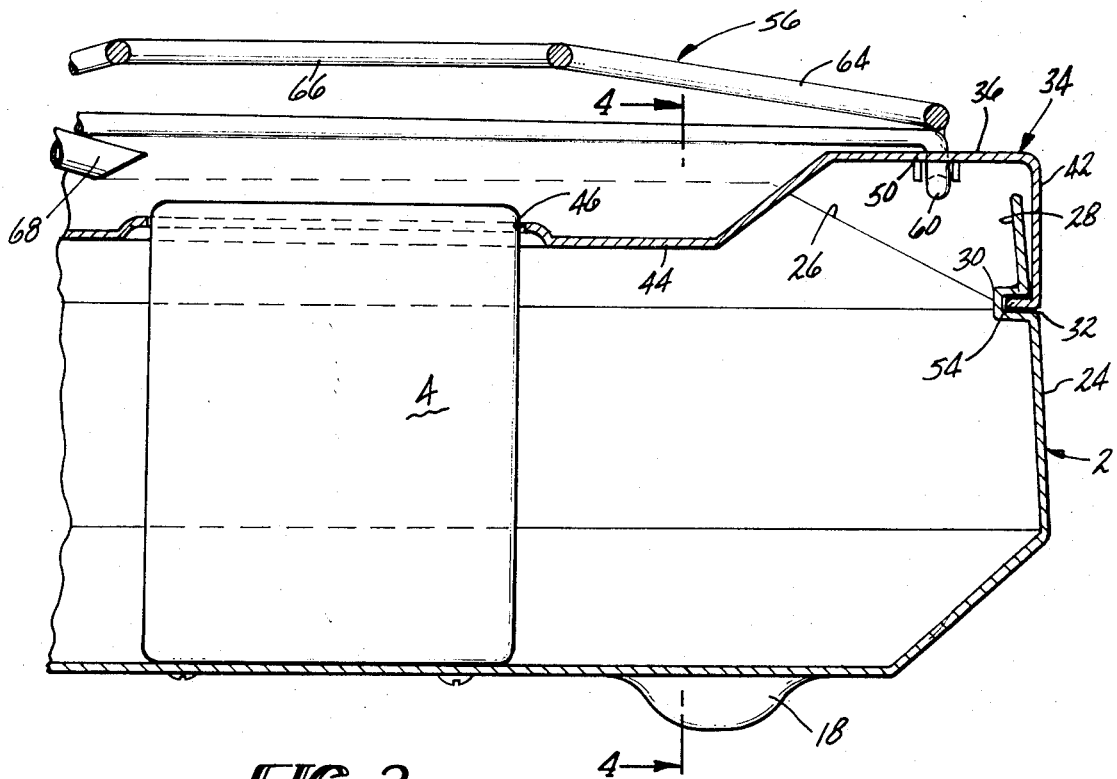
FIG. 3 is a sectional view taken along line 3—3 of FIG. 1 and showing details of the resilient interlock between the tray and case, and the manner in which the grill is seated on the tray.

Referring now to FIGS. 1 and 2, the stove includes a casing portion 2 which serves as a base for the stove, and to which are secured the burners 4, fuel conduits 6, ignitor electrode 8, electrode conductor 10, piezo-electric ignitor device (not shown), ignitor device actuating knob 12, and burner fuel flow control knobs 14. The stove casing 2 includes a bottom wall 16 which is dimpled, as at 18, to form feet for the stove, a front wall 20, a back wall 22, and side walls 24. The front and back walls 20 and 22 respectfully are provided with upwardly and inwardly projecting tabs 26 which are resilient and can be sprung inwardly. The side walls 24 are provided with upwardly and inwardly extending tabs 28 which are also resilient and can be sprung inwardly. Each of the side wall tabs 28 is provided with one or more inwardly extending pockets 30 which form slots 32 in the outer surface of the tabs 28.

The stove assembly also includes a tray 34 having a top surface 36, downwardly depending front and back walls 38 and 40 respectively, and downwardly depending side walls 42. The middle portion of the top surface 36 of the tray is preferably recessed as at 44 to form a shallow receptacle for catching grease spattering and the like. Two apertures 46 are formed in the tray for exposure of the heads of the burners 4. An aperture 48 is formed in the center of the top surface 36, through which aperture extends the ignition electrode 8. A plurality of slots 50 are positioned at opposite marginal sides of the top surface 36 for supporting the grill, as are a pair of opposed apertures 52. The lower edge part of each of the tray side walls 42 is provided with an inwardly extending tongue or flange 54 which is received by the case slots 32 in a manner more thoroughly set forth hereinafter.

The stove assembly also includes a grill 56 preferably made up of a plurality of bent rods joined together to form a unit. The grill 56 includes two basal portions 58 at the front and back thereof and extending over the width of the grill. Each basal portion 58 includes a pair of downwardly extending looped parts 60 which form feet for the grill and which are received in the tray slots 50. A downwardly extending post 62 is also secured to each of the basal portions 58 of the grill, the posts 62 being received in the tray apertures 52. A pair of utensil-supporting members 64 are secured to the basal portions 58 and include support rings 66 which are disposed over the burners 4. A flashback tube 6 is secured to the supporting members 64 and extends toward each of the burners 4. The operation of the flashback tube 68 will be explained in greater detail hereinafter.

Figure 4:
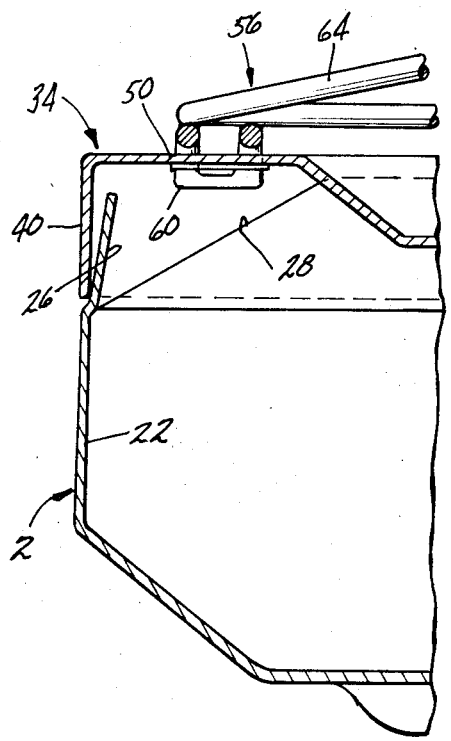
FIG. 4 is a sectional view taken along line 4—4 of FIG. 3 showing further details of the case tab and tray sidewall engagement, and the seating of the grill on the tray.

Referring now to FIGS. 3 and 4, the manner in which the grill 56 is mounted and positioned on the tray 34 is shown in greater detail, as is the manner in which the tray 34 is mounted and held in place on the casing 2. The side walls 42 of the tray 34 overlie the tabs 28 on the case side walls 24, and the tray tongues 54 extend into and are captured by the tab slots 32. Thus the tray 34 cannot be accidentally removed from the casing 2. The tray back wall 40 overlies the tab 26 on the back wall 22 of the casing 2, as does the tray front wall 38 overlie the tab 26 on the casing front wall 20. The tongues 54 and slots 32 thus form a snap-lifting interlock between the tray 34 and casing 2 which cannot be disrupted by simply lifting the tray upward. Furthermore, the tabs 26 and 28, by being positioned inwardly adjacent to the tray walls 38, 40 and 42 prevent the tray from being displaced laterally with respect to the casing. In this manner a snug engagement between the tray and casing, and a pleasing appearance are affected. To intentionally disengage the tray 34 from the casing 2, one need merely press the casing side walls 24 inwardly to displace the pockets 30 away from the tongues 54, and concurrently lift the tray 34 off the casing 2.

The grill 56 is mounted on the tray 34 by merely inserting the grill feet 60 into the tray slots 50 and the grill posts 62 into the tray apertures 52, and lowering the grill onto the tray. In this manner the utensil rings 66 are automatically indexed over the burners 4, and the grill is held against lateral movement with respect to the tray by engagement of the grill feet 60 and tray slots 50, and grill posts 62 and tray apertures 52. The grill 56 can be removed from the tray by a simple upwardly lifting of the grill away from the tray. Thus the grill and tray can easily be disassembled from the stove case and from each other for cleaning and maintenance.

Figure 5:
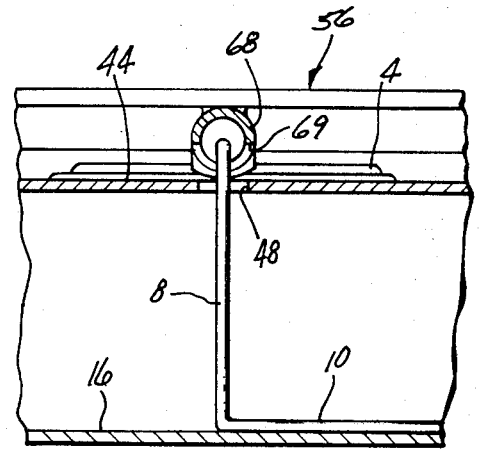
FIG. 5 is a fragmented vertical sectional view of the stove showing details of the spark gap portion of the burner ignition system.

Referring now to FIG. 5, there follows a brief description of the mode of operation of the ignition system preferred for use with the stove of this invention. The ignition electrode 8 extends upwardly from the bottom wall 16 of the case 2 and is connected to an electrical conductor 10 which in turn is connected to a piezo-electric device (not shown). The piezo-electric device is of conventional construction, is mounted on the inside of the case front wall 20 and is actuated by turning the knob 12. The electrode 8 extends through the tray aperture 48 and through a cutout 69 in the flashback tube 68. The electrode 8 terminates a predetermined distance away from the wall of the tube 68, which distance provides a spark gap for the ignitor. As previously noted, the tube 68 is secured to the grill 56. To ignite a burner 4, the appropriate fuel control knob 14 is turned causing a flow of gaseous fuel to the burner 4 to be emitted thereby. Gaseous fuel emitted by the burner 4 enters the open end of the tube 68 and travels backward therethrough toward the spark gap. The piezo-electric element is then actuated by turning the knob 12, and a spark is caused to jump between the tip of the electrode 8 and the tube 68, thus igniting the fuel which has entered the tube. The ignition flame then flashes back through the tube 68 to the open burner to ignite the flow of fuel issuing therefrom.

It will be readily appreciated that the stove assembly of this invention provides a sturdy and dependable structure when assembled, but which structure can be readily disassembled in order to thoroughly clean the parts of the stove which become dirtiest during use. The structure is simple yet reliable, and produces an overall image which is most pleasing to the eye when assembled.

Since many changes and variations of the disclosed embodiment of the invention may be made without departing from the inventive concept, it is not intended to limit the invention otherwise than as required by the appended claims.

What is claimed is:

1. A portable camp stove comprising:
   a. a casing;
   b. burner means mounted on said casing;
   c. means to delivery a supply of fuel to said burner means;
   d. a tray mounted on said casing and spanning the latter to protect said casing; and
   e. releasable latching means on said casing and said tray means and operable to latch said tray to said casing, and said latching means being manually disruptable to permit removal of said tray from engagement with said casing, said releasable latching means including a slot on one of said tray and casing, and a tongue on the other of said tray and casing, said tongue being insertable into said slot in the interlocking fashion for latching said tray to said casing and one of said tongue and said slot being deflectable away from the other of said tongue and said slot or releasing said tray from said casing.

2. A portable camp stove comprising:
   a. casing having a bottom, opposed sets of front and rear walls and opposed sets of side walls, said opposed sets of walls including upwardly and inwardly extending resilient tabs thereon;
   b. burner means mounted on said casing bottom;
   c. means for delivering fuel to said burner means;
   d. a tray mounted on said casing, said tray including opposed sets of front and rear walls and opposed sets of side walls, said opposed sets of walls overlying said casing tabs and in face-to-face contact therewith; and
   e. one of said opposed sets of said tabs and said tray walls being provided with slots, and the corresponding other of said opposed sets of tabs and said tray walls being provided with tongues, said tongues and said slots being interlocked for latching said tray to said casing, and the one of said tongues and said slots formed on said tabs being deflectable away from the other of said tongues and said slots formed on said tray walls for releasing said tray from said casing.

3. The camp stove of claim 2, further comprising openings formed on said tray, and grill means for supporting cooking utensils above said burners, said grill means including projections receivable within said tray openings to position said grill means on said tray.

* * * * *